United States Patent Office 3,716,592
Patented Feb. 13, 1973

3,716,592
PROCESS FOR THE PREPARATION OF ALKYL, PERFLUOROALKYL AND ARYL IODIDES
Leonard S. Silbert, Philadelphia, Pa., assignor to the United States of America as represented by the Secretary of Agriculture
No Drawing. Original application Mar. 23, 1970, Ser. No. 24,923, now Patent No. 3,652,682. Divided and this application Nov. 12, 1971, Ser. No. 198,444
Int. Cl. C07c 25/04
U.S. Cl. 260—650 R
1 Claim

ABSTRACT OF THE DISCLOSURE

High yields of alkyl, perfluoroalkyl and aryl iodides are prepared directly from their corresponding carboxylic acids by reaction in solution with iodine and aroyl peroxide or t-butylperoxy isopropyl carbonate. The reaction is conducted at a temperature of about 110–125° C. for about two to three hours in solvents such as 1,3-dichloropropane, 1,3-dibromopropane and 1,1,2,2-tetrachlorodifluorethane. Solvents such as 1,2-dichloroethane and carbon tetrachloride can be used as solvents but they require longer reaction times.

---

This is a division, of application Ser. No. 24,923 filed Mar. 23, 1970 now U.S. Pat. No. 3,652,682.

A non-exclusive, irrevocable, royalty-free license in the invention herein described, throughout the world for all purposes of the United States Government, with the power to grant sublicenses for such purposes, is hereby granted to the Government of the United States of America.

This invenion relates to alkyl, perfluoroalkyl, and aryl iodides and more specifically to a novel process for preparing these compounds directly from their corresponding carboxylic acids by reaction in solution with iodine and aroyl peroxide or t-butyl perester.

Organic iodides such as cetyl trimethyl ammonium iodide and cetyl pyridinium iodide that can be prepared by the method of this invention find use as disinfectants and germicides. Others, such as cetyl iodide react with tertiary amines to form tetraalkyl ammonium iodide salts which are used as supporting electrolytes in polarography. Iodides are also used as dyes such as erythrosin and Rose Bengal, as photographic sensitizers such as the cyanine dyes and in compounds of medical interest such as thyroxin and iodoform. The iodides also find use as intermediates in the preparation of other compounds. Nucleophilic displacement reactions of the iodides yield other compounds such as sulfonic acid esters, nitro derivatives and mercaptans.

As described in copending application entitled "Process for the Preparation of Alkyl and Aryl Iodides," Ser. No. 708,800 filed Feb. 28, 1968, aryl and alkyl iodides can be prepared by decomposition of aroyl and acyl peroxides in selected solvent systems. Practical application of that process requires solvents which are relatively inert to the reactants yet dissolve them without difficulty and solvents which have convenient boiling points, preferably between 90 and 130° C., so that the peroxide decomposes rapidly and controllably.

While investigating other aspects of that reaction, I unexpectedly discovered a new reaction for preparing alkyl, perfluoroalkyl, and aryl iodides. In this reaction, peroxide abstracts hydrogen from the carboxylic acid function and the acyl, perfluoroacyl, or aroyl hypoiodite that is generated decomposes to alkyl, perfluoroalkyl, or aryl iodide, respectively, in accordance with Equation 1 illustrated for benzoyl peroxide and an aliphatic acid.

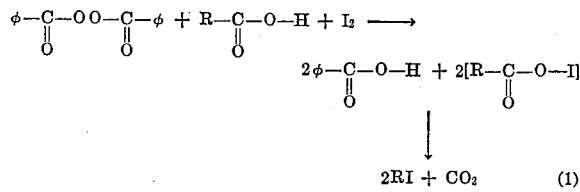

(1)

An object of this invention is to provide a novel means of preparing alkyl, perfluoroalkyl, and aryl iodides directly from their corresponding carboxylic acids.

According to this invention, alkyl, perfluoroalkyl and aryl iodides are prepared directly from their corresponding carboxylic acids by reaction in solution with iodine and peroxide or perester.

Suitable peroxides for the process are aroyl peroxides such as benzoyl peroxide, p,p'-t-butyl benzoyl peroxide, toluoyl peroxides, chlorobenzoyl peroxides and nitrobenzoyl peroxides. In addition, peresters like t-butylperoxy isopropyl carbonate (BPIC) may be used.

The acids mays be aliphatic, perfluoro aliphatic, aromatic or perfluoro aromatic.

The reaction is conducted in solvents like 1,3-dichloropropane, 1,1,2,2-tetrachlorodifluorethane (Freon 112) and 1,3-dibromopropane using stoichiometric quantities of acid, peroxide and iodine, i.e., 2 moles of monobasic acid, 1 mole of aroyl peroxide or 2 moles of BPIC, and 1 mole of iodine. However, yields are improved by using higher ratios of iodine. The reactions are depicted by Equation 2 for aryol peroxides and Equation 3 for BPIC.

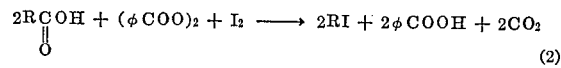

(2)

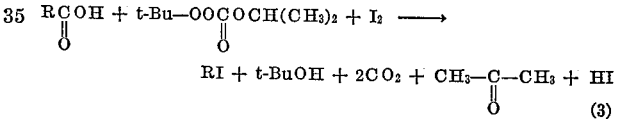

(3)

Theoretically, the isopropoxy radical should also abstract hydrogen, but this radical being of lower stability than the t-butoxy radical rapidly decomposes at temperatures above room temperature thereby eliminating the isopropoxy radical in the hydrogen abstraction process. Hence the t-butoxy radical serves to remove the hydrogen atom of the carboxyl group.

When aliphatic acids are reacted with either aroyl peroxide or BPIC, high yields, 80–90%, of alkyl iodides are obtained. High yields are also obtained when aromatic acids are reacted with BPIC.

Carbon tetrachloride and 1,2-dichloroethane can be used as solvents for the reactions but their lower boiling points require longer times to complete the reaction.

Results for conversions of stoichiometric molar ratios of octanoic acid and benzoyl peroxide are recorded in Table I. Iodobenzene as a product of the benzoyl peroxide reaction with iodine is formed together with the alkyl iodide but its yield diminishes with an increase in iodine concentration amounting to only 2% of the total iodine mixture at a 200% iodine excess.

Benzoyl peroxide reacts with perfluoroaliphatic carboxylic acids to yield perfluoroalkyl iodides in high yields. For instance, benzoyl peroxide and perfluorooctanoic acid reacted with iodine, 50% excess, in 1,3-dibromopropane solution to give a 60% yield of perfluoroheptyl iodide. The higher boiling 1,3-dibromopropane was used in place of 1,3-dichloropropane to effect easier separation of the product. Benzoyl peroxide, perfluoroaliphatic carboxylic acid and iodine (1:2:1.5) reacted at 110° C. for 2 hours in 1,3-dibromopropane solution (0.35 molar in benzoyl peroxide concentration).

The aromatic aroyl peroxides will react with aromatic acids in the presence of iodine to give a mixture of iodides, one corresponding to the acid and the other to the peroxide. This is illustrated for a 1:2 mole ratio of peroxide to acid in iodine (50% excess) solution of 1,3-dichloropropane as follows: (the figures in parentheses are percent iodides formed based on the molar conversion of peroxide) benzoyl peroxide and m-chlorobenzoic acid gave iodochlorobenzene (34%) and iodobenzene (38%); benzoyl peroxide and p-nitrobenzoic acid gave iodonitrobenzene (13%) and iodobenzene (55%); p-nitrobenzoyl peroxide and benzoic acid gave iodonitrobenzene (16%) and iodobenzene (61%); benzoyl peroxide and anisic acid gave iodoanisole (11%) and iodobenzene (32%); benzoyl peroxide and perfluorobenzoic acid gave iodopentafluorobenzene (1.0%) and iodobenzene (21%).

Results of the reaction of BPIC and aliphatic and aromatic acids with iodine are shown in Table II. Higher product yields are obtained when the alcohols are distilled off as the reaction proceeds.

The preparation of heptadecyl iodide as now described is typical of the perparative procedures of this invention using an aroyl peroxide and BPIC.

Benzoyl peroxide procedure

Iodine (12.7 g., 0.05 M), stearic acid (14.2 g., 0.05 M), and benzoyl peroxide (6.05 g., 0.025 M) were weighed into a flask equipped with a small distillation head. 1,3-dichloropropane (42 mls.) and Freon 112 (25 mls.) were added as co-solvents, the latter to minimize the volume of the higher boiling discolorpropane and to fluidize the semi-dissolved mixture. A homogeneous solution was attained as the temperature was raised to the boiling point of the Freon which distilled with only small losses of iodine. When the temperature reached 110° C., heating was continued for a total time of 3 hours. All of the solvent and some of the benzoic acid was distilled from the mixture while the pressure was reduced and heating continued.

An ethereal solution of the residue was treated with sodium sulfite solution to remove free iodine and the solvent was then evaporated. The crude product (20 g.) was eluted with petroleum ether through a chromatographic column containing silica gel for separation of the bulk of heptadecyl iodide from residual benzoic acid. Evaporation of the main fraction gave heptadecyl iodide (17.3 g.; Theory 18.3 g.). Recrystallization from a mixture of acetone (70 ml.) and 95% ethanol (25 ml.) at 40° yielded pure compound (13.0 g., 71% yield).

t-Butylperoxy isopropyl carbonate (BPIC) procedure

Iodine (12.7 gm., 0.05 M) and stearic acid (14.2 gm., 0.05 M) were dissolved at 70° C. in 1,3-dichloropropane (45 mls.) in a round bottom flask (200 mls.) equipped with a nitrogen inlet and distillation head. BPIC (10.4 gm. of 85% purity, 0.05 M was added, the mixture heated at 125° C. for one hour to distill off the t-butanol and acetone formed. Reaction was completed at 135° C. for two hours after which the solvent (and some iodine) was distilled under an increased nitrogen flow. The crude product was dissolved in warm petroleum ether, some insoluble compound was filtered off and the solvent and iodine evaporated. Yield of crude product was 16 gms. (theory, 18.3 gm.).

TABLE I

Reaction of benzoyl peroxide and octanoic acid with iodine in 1,3-dichloropropane

| $I_2$/peroxide | 1-iodoheptane,[a] percent | Iodobenzene,[a] percent | $I_2$ consumed, percent |
|---|---|---|---|
| 1.0 | 74 | 18 | 94 |
| 1.5 | 83 | 9 | 95 |
| 3.0 | 90 | 2 | 100 |

[a] Yield based on peroxide.

TABLE II

Reaction of BPIC[a] and Aliphatic and Aromatic Acids with Iodine

| Acid | Molar ratio Acid:$I_2$:Perester | Iodide, percent | Reactants consumed | | | Reaction conditions | |
|---|---|---|---|---|---|---|---|
| | | | Acid, percent | $I_2$, percent | Perester, percent | Time, hrs. | Temperature, °C. |
| Octanoic | 2:1.5:1 | [b] 26 | 37 | 28 | 44 | 3 | [c] 110 |
| Do | 2:1.5:1 | [b] 16 | 15 | 88 | 99 | 2 | [c] 120 |
| Do | 2:1.5:1 | [b] 42 | 51 | 72 | 100 | 2 | [d] 125 |
| Do | 1:1:1 | [b] 81 | ([e]) | 125 | 84 | 2 | [d] 120–130 |
| Do | 1:1:1 | [b] 81 | ([e]) | 128 | 97 | 2 | [d] 135 |
| Sebacic | 0.5:1:1 | [f] 82 | ([e]) | 140 | 93 | 2 | [d] 135 |
| Benzoic | 1:1:1 | [g] 72 | ([e]) | 130 | 94 | 2 | [d] 135 |

[a] t-Butylperoxy isopropyl carbonate.
[b] Iodoheptane.
[c] Alcohols not distilled off as reaction proceeded.
[d] Alcohols distilled off as reaction proceeded.
[e] Acid not experimentally determined.
[f] 1,8-diiodooctane.
[g] Iodobenzene.

I claim:

1. A process for preparing an aryl iodide comprising reacting benzoic acid and t-butylperoxy isopropyl carbonate with iodine in the presence of a solvent selected from the group consisting of 1,3-dichloropropane, 1,2-dichloroethane, 1,1,2,2-tetrachlorodifluorethane, 1,3-dibromopropane and carbon tetrachloride.

References Cited

Hammond, J.A.C.S., 72, pp. 3737–3743 (1950).
Hammond et al., J.A.C.S., 72, pp. 4711–47–15 (1950).
Walling et al., J.A.C.S., 80, pp. 228–233 (1958).

HOWARD T. MARS, Primary Examiner